(12) United States Patent
Waninger et al.

(10) Patent No.: US 7,513,342 B2
(45) Date of Patent: Apr. 7, 2009

(54) BRAKE MECHANISM FOR A VEHICLE, IN PARTICULAR FOR A MOTOR VEHICLE

(75) Inventors: Robert Waninger, Ingolstadt (DE); Nikola Zupan, Pforring (DE)

(73) Assignee: Audi AG, Ingolstadt (DE)

( * ) Notice: Subject to any disclaimer, the term of this patent is extended or adjusted under 35 U.S.C. 154(b) by 95 days.

(21) Appl. No.: 11/305,104

(22) Filed: Dec. 19, 2005

(65) Prior Publication Data

US 2006/0137945 A1    Jun. 29, 2006

(30) Foreign Application Priority Data

Dec. 23, 2004    (DE) ....................... 10 2004 062 082

(51) Int. Cl.
*F16D 65/12* (2006.01)
(52) U.S. Cl. ................................. 188/251 M
(58) Field of Classification Search ........... 188/218 XL, 188/254 M, 251 A, 251 M; 428/293.4, 381, 428/408
See application file for complete search history.

(56) References Cited

U.S. PATENT DOCUMENTS

| | | | | |
|---|---|---|---|---|
| 4,485,898 A | * | 12/1984 | Bracken et al. ......... | 188/250 B |
| 5,094,901 A | | 3/1992 | Gray | |
| 5,536,574 A | * | 7/1996 | Carter ......................... | 428/381 |
| 5,597,053 A | * | 1/1997 | Weng .......................... | 188/256 |
| 6,585,089 B1 | * | 7/2003 | Parker .................. | 188/218 XL |
| 6,740,408 B2 | * | 5/2004 | Thebault et al. ............. | 428/408 |
| 6,759,117 B2 | * | 7/2004 | Bauer et al. ............... | 428/293.4 |
| 7,097,009 B2 | * | 8/2006 | Shao et al. ............... | 188/251 A |
| 2003/0010585 A1 | * | 1/2003 | Okada et al. ............ | 188/251 A |

FOREIGN PATENT DOCUMENTS

| | | |
|---|---|---|
| DE | 40 24 547 | 8/1990 |
| DE | 101 61 218 A1 | 7/2003 |
| DE | 102 10 175 | 10/2003 |
| DE | 101 61 218 B4 | 6/2004 |
| EP | 1 273 818 | 6/2002 |

* cited by examiner

*Primary Examiner*—Christopher P Schwartz
(74) *Attorney, Agent, or Firm*—Novak Druce & Quigg LLP

(57) ABSTRACT

The invention relates to a brake mechanism for a vehicle, in particular for a motor vehicle, with a brake disk and a friction lining. As claimed in the invention, the friction lining forms a reservoir for a protective agent, preferably additives, which transfers the protective agent to the brake disk in the course of a frictional connection between the friction lining and the brake disk.

14 Claims, No Drawings

BRAKE MECHANISM FOR A VEHICLE, IN PARTICULAR FOR A MOTOR VEHICLE

This application claims priority from German Application No. 10 2004 062 082.2 filed Dec. 23, 2004.

The invention relates to a brake mechanism for a vehicle, in particular for a motor vehicle as claimed in the preamble of claim 1.

A generally known generic brake mechanism for a motor vehicle has a brake disk and a friction lining. Specifically the friction lining is formed by a brake lining, during the braking process a frictional connection being established between the brake disk and the brake lining.

In the production of brake disks, complex composite systems with a ceramic matrix are being increasingly used at present. The matrix used here consists preferably of silicon (Si) or silicon carbides (SiC) and contains carbon fibers or carbon-containing fibers as the respective reinforcing fibers. The silicon-infiltrated carbon fiber composite materials formed therefrom have good tribologic properties even under high loads and/or at high temperatures; this is advantageous in an application as a brake disk. Based on the different thermal and volumetric expansion between the matrix of these composite materials and the reinforcing fibers, in the cooling phase from the manufacturing temperature of approximately 1600° C. to an ambient temperature of approximately 20° C., internal material stress which is relieved by relief cracks can build up. The cracks form in the Si or SiC matrix in a microscopic and/or macroscopic magnitude, and for example carbon fibers can be used as crack stopping elements. The relief cracks in a composite material lead to channel-like, three-dimensional and mesh-type crack channels which can pass through the entire brake disk body. These crack channels act on liquids to promote capillaries so that under certain conditions liquid inclusions can occur. These inclusions of liquids or also materials introduced into the brake disk from the brake lining or the vicinity can cause damage to the composite material and/or increased oxidation of the carbon fibers or the carbon-continuing fibers. The basic strength of the composite material can thus be weakened; this can lead to a reduction of the service life of the brake disk.

Various measures are known for reducing or preventing this damage to the brake disk. Thus, for example, DE 101 33 635 A1 discloses a brake disk which is produced from the composite material detailed above. Viewed in cross section, this brake disk has a zone which is exposed to wear and which interacts tribologically with the brake lining as the friction surface, and a sujacent support zone. The friction surface has friction and wear properties, while the support zone is designed to absorb and dissipate friction energy or braking energy. Between the friction surface and the support zone there is a protective layer which contains additives for the formation of self-healing layers. These additives can reduce or prevent the oxidation of the carbon found in the brake disk or the oxidation of the oxidation-sensitive portions of the matrix. Moreover there can be additives which form self-healing layers.

Furthermore DE 101 61 218 B4 discloses a carbon-containing brake disk which is fiber-reinforced for oxidation protection, with a matrix containing silicon carbide (SiC) in the edge layer. This brake disk is impregnated during production with an aqueous, phosphate-containing solution, compounds being formed which are suited for formation of self-healing glass and which are not soluble therefrom in subsequent heat treatment. Moreover the brake disk is treated by oxidation to form silicon oxide ($SiO_2$).

With these self-healing glasses a certain degree of protection can be ensured for a brake disk in new condition, it being possible for this protection to be disadvantageously broken down in operation of the brake mechanism due to collective loading by temperature, pressure, and secondary reactions with predominantly oxygen and other elements, such as for example zinc (Zn), sodium (Na) or chlorine (Cl), so that the self-healing effect can proceed only partially under quite specific conditions. Moreover, in operation of the brake mechanism new crack channels and capillaries can form due to temperature differences and the associated stresses and cannot be healed or can be only inadequately healed by means of the above described measures. Likewise cavities and enlarged oxidative attack surfaces resulting from oxidation are formed very quickly and disadvantageously cannot be prevented to the extent required by the above described new formation of glasses. Thus, the oxidation of the carbon fibers continuously produces new capillaries; this leads to an oxidative reaction which progresses more rapidly and thus to the destruction of the brake disk.

The object of the invention is to devise an alternative brake mechanism for a vehicle, in particular for a motor vehicle, with which optimum protection, especially optimum oxidation protection and/or optimum protection against absorption of moisture, becomes very easily possible for a brake disk.

This object is achieved with the features of claim 1.

As claimed in claim 1, the friction lining forms a reservoir for a protective agent which in the course of a frictional connection between the friction lining and the brake disk transfers to the brake disk an amount of the protective agent which is determined relative to the duration of the frictional connection.

Advantageously here a reservoir of the protective agent which is external relative to the brake disk is thus made available, with which the protective agent can be continuously delivered to the brake disk. That is, in the course of the frictional connection new protective agent is continuously transferred from the friction lining to the brake disk by wear. Thus, in the operation of the brake mechanism each time the frictional connection is established protective agent is transferred to the brake disk so that in this way optimum protection, especially optimum oxidation protection and/or optimum protection against the absorption of moisture, can be obtained for the brake disk. Especially for cracks, capillaries, etc., which form anew in the course of brake operation, the continuous delivery of the protective agent makes possible a protective effect or a self-healing effect even at those locations on the brake disk where there were originally no cracks and capillaries, so that the service life of the brake disk can thus be advantageously extended. The protective agent which is accommodated by preference as an additive in the external reservoir can contain for example hydrophobic components which penetrate into the capillaries which have formed in the brake disk and in this way reduce or entirely prevent the capillary action. Furthermore, for example in the transfer of the protective agent, raw materials for formation of self-healing glasses can be introduced into the brake disk. Attachment of a hydrophobic protective film to the friction surface of the brake disk for preventing the penetration of liquids into the capillaries is also easily possible. Moreover, the protective agents can contain so-called "sacrificial elements" which bond with the oxygen present in the brake disk so that possible oxidation of the oxidation-sensitive components of the brake disk is thus prevented.

The protective agent which has been transferred to the brake disk can be converted into a reaction product which is deposited in the brake disk by the heat of friction which forms in the frictional connection. The protective agent can also be converted with a reaction partner, for example from the vicinity of the brake disk, into the reaction product. Depending on the version of the protective agent, the reaction product can be deposited directly in the brake disk so that cracks or capillaries present in the brake disk are closed or capillary action is prevented and/or diminished. If there are aqueous solutions in the capillaries in the brake disk which originate for example from the vicinity of the brake disk, with the reaction product which originates from the protective agent the surface tension of these aqueous solutions can be increased in order to thus prevent and/or reduce the capillary action. Alternatively or in addition, the protective agent which has been transferred to the brake disk can react with a material component of the brake disk to form a reaction product. That is, the material components of the brake disk with the transferred protective agent form a reaction product so that components which may potentially damage the brake disk cannot react with the material components of the brake disk for any damage to the latter, by which damage to the matrix of the brake disk is prevented. The activation energy which may be necessary for the chemical reaction of the protective agent is produced by the frictional heat which forms in the frictional connection. If the friction lining is moreover the brake lining, heat of friction is produced in each braking process so that in each braking process protective agent is delivered from the brake lining into the brake disk.

In particular the transfer of protective agents for oxidation protection is advantageous in the brake disk produced as claimed in claim 2 and which brake disk can be manufactured from a preferably fiber-reinforced, carbon-containing and/or oxide ceramic composite material with a matrix preferably containing silicon carbide (SiC) and/or silicon (Si) and/or silicon alloys at least in one edge layer. Both the carbon contained in the brake disk and also the silicon components present in the matrix of the brake disk can oxidize; this can be promoted especially by the capillaries formed in the brake disk and the associated possibility of penetration of oxidation-promoting raw materials for example from the vicinity of the brake disk. In order to prevent or reduce these oxidation processes, the protective agent present in the reservoir of the protective agent of the friction lining can be a special antioxidation agent.

In theory the friction lining could also be a lining which is provided separately from the brake lining. Advantageously and preferably however the friction lining as claimed in claim 3 is at the same time the brake lining into which the reservoir of the protective agent is integrated.

According to one development as claimed in claim 4, the protective agent is distributed essentially uniformly over the surface and/or material thickness in the brake lining. This ensures that even for wear of the brake lining caused by braking, at each instant of the service life of the brake lining transfer of the protective agent accommodated in the brake lining is possible. The uniform distribution in the brake lining always makes available the protective agent in uniform amounts.

In one specific embodiment as claimed in claim 5, the protective agent can be rhenium (Re) and/or boron (B) and/or titanium (Ti) and/or silicon (Si) and/or silicon carbide (SiC) and/or carbon (C) and/or aluminum (Al) and/or phosphorus (P). The choice of the protective agent or agents is dependent on the desired protective effect on the brake disk. Basically a combination of several protective agents in the friction lining is also conceivable, and the list of protective agents indicated in the foregoing is to be regarded merely as a an example and other protective agents can be added.

As claimed in claim 6, the protective agent can also form a water-repellent layer on the brake disk. Thus a protective effect against the absorption of moisture can be obtained, by which for example reactions which are potentially damaging to the brake disk can be prevented or at least reduced.

The invention is detailed using one exemplary embodiment.

In this example the protective layer is to arise in a carbon fiber-reinforced SiC matrix by means of oxidation of boron nitrides (BN). For this purpose an activation temperature of 820° C. is necessary to form boron oxides, such as for example boron trioxide ($B_2O_3$), which can also be oxidized to borate glasses. The activation temperature for this chemical reaction is reached in the intermediate friction layer of the friction lining-brake disk tribologic system during the braking process, in which the boron nitrides can thus be deposited in the brake disk from the brake lining as the external reservoir during oxidation.

The invention claimed is:

1. A brake mechanism for a vehicle comprising:
   a rotatable disk including a first material functional to impart reinforcement thereto, chemically reactive with a component of a second material presentable in contact with said first material, generated by the heat of friction produced upon the engagement of a liner with said disk, having the effect of diminishing the effectiveness of the reinforcement properties of said first material; and
   a liner engageable with said disk upon rotation of said disk, including a third material transferable to said disk upon engagement of said liner with said disk, chemically reactive with said component.

2. A brake mechanism according to claim 1 wherein said first material is embedded in a matrix of a fourth material.

3. A brake mechanism according to claim 2 wherein said fourth material consists of at least one material selected from a group of materials including silicon, silicon carbide and silicon alloys.

4. A brake mechanism according to claim 2 wherein said matrix material is disposed in at least one surface layer of said disk.

5. A brake mechanism according to claim 2 wherein said first material comprises carbon fiber.

6. The brake mechanism according to claim 1 wherein said component is oxygen and said first and third materials are subject to oxidation.

7. The brake mechanism according to claim 6 wherein said second material is water.

8. The brake mechanism according to claim 1 wherein said first material includes carbon.

9. The brake mechanism according to claim 1 wherein said third material consists of at least one material selected from a group of materials including rhenium, boron, titanium, silicon, silicon carbide, carbon, aluminum and phosphorus.

10. A brake mechanism according to claim 1 wherein said third material is functional to form a water-repellant layer on said disk.

11. A brake mechanism according to claim 1 wherein said third material is functional to bond to said first material.

12. A brake mechanism according to claim 1 wherein said third material is hydrophilic.

13. A brake mechanism according to claim 1 wherein said liner comprises a brake pad.

14. A brake mechanism according to claim 1 wherein said third material is functional in increasing the surface tension of moisture disposed on said disk.

* * * * *